United States Patent
Pickens et al.

(10) Patent No.: US 6,517,727 B2
(45) Date of Patent: Feb. 11, 2003

(54) METHOD OF OPERATING A CHEMICAL FEEDER

(75) Inventors: Stanley R. Pickens, Monroeville, PA (US); Richard H. Ferguson, Cecil, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 37 days.

(21) Appl. No.: 09/891,939

(22) Filed: Jun. 26, 2001

(65) Prior Publication Data

US 2002/0195404 A1 Dec. 26, 2002

(51) Int. Cl.[7] .................................................. C02F 1/76
(52) U.S. Cl. ........................ 210/755; 210/169; 422/28; 137/14
(58) Field of Search ................................. 210/739, 755, 210/101, 169; 422/28; 137/12, 14, 268

(56) References Cited

U.S. PATENT DOCUMENTS

| | | | |
|---|---|---|---|
| 3,595,395 A | 7/1971 | Lorenzen | 210/169 |
| 3,595,786 A | 7/1971 | Horvath et al. | 210/198 |
| 3,994,420 A | * 11/1976 | Harper et al. | |
| 4,584,106 A | 4/1986 | Held | 210/754 |
| 4,732,689 A | 3/1988 | Harvey et al. | 210/754 |
| 4,759,907 A | 7/1988 | Kawolics et al. | 422/7 |
| 4,780,197 A | * 10/1988 | Schuman | |
| 4,842,729 A | 6/1989 | Buchan | 210/198.1 |
| 5,089,127 A | 2/1992 | Junker et al. | 210/206 |
| 5,384,102 A | 1/1995 | Ferguson et al. | 422/264 |
| 5,427,748 A | 6/1995 | Wiedrich et al. | 422/264 |
| 5,441,711 A | 8/1995 | Drewery et al. | 422/264 |
| 5,447,641 A | 9/1995 | Wittig | 210/756 |
| 5,863,128 A | 1/1999 | Mazzei | 366/163.2 |
| 5,932,093 A | 8/1999 | Chulick | 210/169 |
| 6,077,484 A | 6/2000 | Graves | 422/277 |

OTHER PUBLICATIONS

U.S. Ser. No. 09/738,179, filed Dec. 15, 2000, Chemical Feeder, Stanley R. Pickens and Richard H. Ferguson.
"What is a Mazzei Injector"; Information Bulletin; http://www.mazzei-injector.com/injector.htm; May 22, 2000.
"How to Select and Install a Mazzei Injector" Information Bulletin; http://www.mazzei-injector.com/install.htm; May 22, 2000.

* cited by examiner

Primary Examiner—Betsey Morrison Hoey
(74) Attorney, Agent, or Firm—Dennis G. Millman (57) ABSTRACT

Describes a method for dissolving a solid chemical material, such as calcium hypochlorite, with a solvating liquid, e.g., water, in a chemical feeder operating under positive pressure wherein an inert gas, e.g., air, is injected into the solvating liquid, e.g., by use of an injector nozzle, and the resultant mixture of inert gas and solvating liquid is forwarded to the chemical feeder. Sufficient air is charged to the chemical feeder to limit the level of solvating liquid in the feeder and thereby limit the amount of solid chemical material contacted by the solvating liquid.

51 Claims, 6 Drawing Sheets

METHOD OF OPERATING A CHEMICAL FEEDER

DESCRIPTION OF THE INVENTION

The present invention is directed to a method of operating automatic chemical feeders useful for preparing a liquid solution, e.g., an aqueous solution, of a chemical material, such as a sanitizing chemical, wherein the chemical material is contacted with a fluid in which the chemical material is soluble, i.e., a solvating fluid. The resultant liquid solution is discharged from the feeder and forwarded to the point of application, e.g., a body of water, where it is to be used. In particular, the present invention is directed to method of operating a pressurized chemical feeder so that the feeder automatically dispenses controlled amounts of a solution of a chemical material, e.g., a sanitizing chemical such as calcium hypochlorite, in a reliable, efficient and cost effective manner. Examples of systems that can be treated with aqueous solutions produced by the method of the present invention include water treatment plants, potable water supplies, water for industrial or process usage, waste water systems, water systems for cooling towers, run-off water, swimming pools, hot tubs and the like.

More particularly, the present invention is directed to a novel method of operating pressurized chemical feeders, i.e., feeders that operate under positive pressure, so that only a desired portion of the chemical material charged to the feeder is contacted with solvating fluid. Still more particularly, the novel method comprises establishing and maintaining an atmosphere of substantially inert gas, e.g., air, in the chemical feeder above the soluble chemical material, e.g., a solid chemical material such as calcium hypochlorite tablets, while the feeder is operating, thereby to control the level of solvating fluid within the feeder and hence the amount of chemical material contacted by the solvating fluid. As used herein and as later more definitively defined, the term "substantially inert gas" or "inert gas" means a gas that is substantially chemically inert with respect to the soluble chemical material within the feeder.

Chemical feeders for producing solutions of chemical materials are known. Particularly well known are chemical feeders for producing aqueous solutions of chemical materials such as sanitizing agents, e.g., calcium hypochlorite, that are used for the treatment of water and water systems. Typically, such feeders operate by providing a solid composition, which contains a soluble chemical material of a suitable shape, e.g., tablets, pellets or granules, within a suitable chamber and controllably contacting the chemical material (solute) with a solvating fluid, e.g., water or other suitable solvent, thereby to dissolve the chemical material and produce a solution of the chemical material in the solvating fluid or liquid. The solution of chemical material so produced is removed from the feeder and forwarded, directly or indirectly and with or without further treatment (physical or chemical), to the point of application or use. Aqueous solutions of sanitizing agents produced by such feeders have been utilized in various applications, e.g., to disinfect effluent from sewage treatment plants, for sanitizing water used in swimming pools and hot tubs, for the treatment of food supplies and surfaces used in connection with the preparation or treatment of food, e.g., tables, sinks, tanks, walls and floors, and for the treatment of other aqueous streams and water systems. Such feeders have been used also for preparing water-soluble chemicals other than sanitizing agents.

Chlorine, hypochlorous acid and other sanitizing chemicals are used in swimming pool and hot tub applications to control the growth of algae and other organisms in the water. The concentration of the sanitizing chemical in the water, e.g., swimming pool, must be kept between a concentration that is effective to eliminate algae and other objectionable organisms and below a higher concentration that is harmful to the user. Consequently, chemical feeders which produce aqueous solutions of sanitizing agents that are used in the treatment of recreational water for bathing, swimming and hot tubs, have been designed to alleviate the shortcomings that typically accompany periodic manual additions, e.g., by broadcasting of the sanitizing agent over the surface of the recreational water, e.g., a variation in the amount of sanitizing agent added. Examples of chemical feeders are described in U.S. Pat. Nos. 3,595,786; 3,595,395; 4,584,106; 4,732,689; 4,759,907; 4,842,729; 5,089,127; 5,427,748; 5,441,711; 5,447,641; 5,932,093; and 6,077,484.

A feature associated with many chemical feeder installations, such as those described in the above-cited U.S. Pat. Nos. 5,089,127, 5,384,102 and 5,427,748, is that the feeder, when used in a closed system, is installed in close liquid communication with the suction side of a recirculation pump, which results in the feeder operating at or slightly below atmospheric pressure. Such an installation avoids the build-up of pressurized air within the feeder and also the requirements for a feeder design and materials of construction that will withstand positive pressures that are encountered during operation of a feeder at above atmospheric pressures.

Notwithstanding the aforementioned advantages of operating a chemical feeder at atmospheric pressure, there are applications where operating a chemical feeder under positive pressures, i.e., at pressures above atmospheric pressure, e.g., at pressures from just above atmospheric, e.g., 1 pound per square inch gage (psig) (6.9 kPa) to 50 (psig) (345 kPa), is desirable and even required by the particular installation.

Such installations include those where the feeder is located below the level at which the body of water, e.g., the swimming pool, to be treated is situated, e.g., below grade, or where the feeder is in association with a pressurized pipe line, or anytime the pressure at the outlet of the feeder is above ambient pressure. In such installations, the feeder is usually installed in close liquid communication with the outlet side of the recirculation pump, which then must develop at least sufficient force to overcome the static head of pressure represented by the difference in height between the pump and the level of the body of water. For example, water withdrawn from a swimming pool for treatment is forwarded by gravity to a filter and then pumped sequentially to a heater (if used) and the chemical feeder before being returned to the pool. Other arrangements place the filter after the recirculation pump, or position the feeder in a bypass conduit parallel to the main flow line but located on the discharge side of the recirculation pump. A further example is when a feeder is used for the treatment of a potable water supply and the feeder is placed in series with an elevated potable water tank, which is used to supply a water distribution system.

Typically, such pressure feeders are operated in a manner wherein the dissolving or solvating fluid (solvent) introduced into the feeder contacts most or substantially all of the chemical material within the feeder, i.e., the solvating fluid floods the chamber containing the dissolvable chemical material. Such feeders are sometimes referred to as soaker feeders. Further, in the absence of means to allow the solvating fluid to drain out of the soaker feeder when it is not operating, the chemical material in the feeder continues to soak (and dissolve) in the solvating fluid. When "soaking" of the chemical material occurs during periods of feeder inoperation, the concentration of the chemical in the solution within the feeder increases above that desired for normal operating levels, results in premature depletion of the chemical material, and the possible occlusion of contiguous openings by partially dissolved and re-crystallized chemical material. In, for example pressure feeders used to sanitize swimming pools, "soaking" of the chemical material, e.g., calcium hypochlorite, causes delivery to the pool (when the feeder is subsequently placed in an operating mode) of a solution having a chemical material concentration that is much greater than intended, e.g., the level of chemical material will often be enough to "shock" the pool when such a shock treatment is not desired or expected.

When operating a pressurized chemical feeder, it would be desirable to control the level of solvating fluid within the feeder and thereby limit the amount of chemical material within the feeder that is contacted by the solvating fluid. In accordance with the present invention, it has been discovered that by providing a substantially inert gas, e.g., air, within the pressure feeder during its operation, it is possible to control the level of solvating fluid within the feeder, thereby limiting the amount of chemical material contacted by the solvating fluid, which in turn affects the rate at which chemical material in the feeder is dissolved by the solvating fluid and the concentration of chemical material in the solution discharged from the feeder.

In one contemplated and preferred embodiment, substantially inert gas (hereinafter at times referred to as "inert gas") and solvating fluid are introduced simultaneously into the chemical feeder—either through the same (a preferred embodiment) or different conduits. For example, they can be introduced into the feeder simultaneously admixed together through the same conduit, as described in connection with FIGS. 1 and 2, or through separate conduits (not shown in the Figures). Alternatively, the solvating fluid can be introduced continuously into the feeder with the inert gas being introduced discontinuously (batch wise) and either separate from or admixed with the solvating fluid. By simultaneous introduction, as used herein, is meant that the solvating fluid and inert gas (when charged to the feeder) are introduced at the same time.

In a second contemplated embodiment, inert gas is introduced into the feeder prior to introducing the solvating fluid into the feeder to establish a first desired pressure within the feeder. Subsequently, solvating fluid is introduced into the feeder, which action will tend to compress the inert gas already charged to the feeder. Additional inert gas can be introduced into or released from the feeder whereby to establish the desired level of fluid in the feeder, to contact the desired quantity of the chemical material within the feeder and establish a second operating pressure within the feeder. Thereafter, solvating fluid and inert gas (as required) are charged to the feeder (through the same or separate conduits) to maintain the operating conditions (pressure, flow rates, solution concentration, etc.) previously established or subsequently desired. In this second embodiment, the additional inert gas can be introduced into the feeder either continuously (simultaneously with the solvating fluid) or batch wise (as make-up inert gas).

In a third contemplated embodiment, solvating fluid is introduced into the feeder to an initial or desired level or height within the feeder, including filling completely the space within the feeder holding the chemical material. Thereafter, inert gas is introduced into the feeder (through the same or a separate conduit) to displace a portion of the solvating fluid (if required) and establish/maintain the desired operating pressure and level of fluid within the feeder, i.e., the fluid-gas interface. Thereafter, solvating fluid is introduced continuously into the feeder; and inert gas (in amounts required to maintain the desired level of solvating fluid, e.g., the height of the gas-fluid interface) is introduced batch wise or continuously into the feeder through the same or a different conduit to maintain the desired operating conditions (pressure, flow rates, solution concentration, etc).

The amount of inert gas introduced into the feeder is sufficient to provide a buffer zone (head space) of inert gas within the feeder. The volume of the buffer zone is selected to limit the amount of chemical material contacted by the solvating fluid, i.e., to limit the level of the solvating fluid within the feeder. The solvating fluid thus is restrained from rising above the gas-solvating fluid interface.

As with any dynamic system, it is understood by those skilled in the art that the operating conditions of the feeder, e.g., pressure, flow rates of solvent and inert gas, chemical material solution concentration produced in the feeder, etc., can change during feeder operation. For example, as the chemical material charged to the feeder is consumed, its volume will need to be replaced by solvating fluid and/or inert gas. Further, some of the inert gas within the feeder will be dissolved or entrained in the solvating fluid passing through the feeder and thereby removed from the feeder during periods that the feeder is in operation. Also, it is possible that inert gas may leak from the feeder through worn seals, etc. This loss/removal of inert gas from the feeder will require that inert gas be introduced into the feeder during operation to replenish gas lost by such circumstances or other operating events. Make-up gas can be charged continuously or intermittently (batch wise) to the feeder. It is understood that inert gas introduced into the feeder in any of the embodiments discussed or contemplated can be introduced either simultaneously with the introduction of solvating fluid and/or intermittently (batch wise) with the introduction of solvating fluid or when solvating fluid is not introduced into the feeder. In either case, the inert gas can be introduced into the feeder admixed with the solvating fluid and/or separate from the solvating fluid. Preferably, the inert gas is introduced simultaneously and admixed with the solvating fluid.

It is understood further by those skilled in the art that the level of solvating fluid within the feeder and hence the amount of chemical material contacted by such fluid can be varied during operation of the feeder by varying the delivery rate of solvating fluid and/or inert gas to the feeder. Some factors determining the desired level of solvating fluid and the concentration of the solution withdrawn from the feeder is the rate of chemical material delivery desired, and the dissolution rate of the chemical material by the solvating fluid, e.g., some solid forms and compositions of chemical material, such as calcium hypochlorite, will dissolve at different rates. For example, the degree of compaction of a solid material composition can effect the rate of dissolution.

In accordance with the present invention, there is described an improved method for dissolving chemical material provided within a container, e.g., a chemical feeder, wherein solvating fluid in which the chemical material is soluble is introduced into the container and into contact with the chemical material provided within the container, thereby to produce a solution of the chemical material, which is withdrawn from the container. The improvement to such method comprises establishing a positive pressure within the container and controllably maintaining an atmosphere of substantially inert gas in the container at least during the period when solvating fluid contacts the chemical material, thereby to control the level of solvating fluid within the container, limit the amount of chemical material contacted by the solvating fluid at any one particular segment of time during periods of feeder operation, and hence control the rate at which the chemical material is dissolved by the solvating fluid and the concentration of chemical material in the solution removed from the container.

The features that characterize the present invention are pointed out with particularity in the claims, which are annexed to and form an integral part of this disclosure. These and other features of the invention, its advantages and the specific objects obtained by its use will be more fully understood from the following detailed description and the accompanying drawings in which preferred embodiments of the invention are illustrated and described. In the drawings, like reference characters designate like parts.

Other than where otherwise indicated, all numbers and values used in the specification and claims are to be understood as modified in all instances by the term "about."

DETAILED DESCRIPTION OF THE INVENTION

Figure 1:
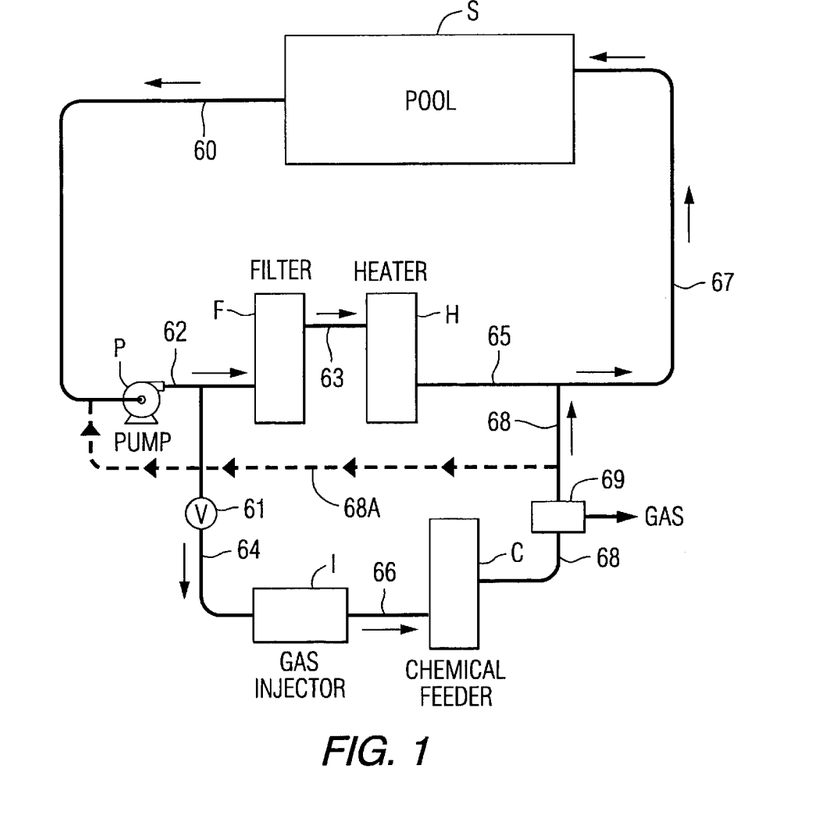
FIG. 1 is a schematic flow diagram of a swimming pool water circulation system incorporating a filter and heater in the main flow of recirculating water, and a mixer-injector, chemical feeder and gas separator in a bypass flow line, which flow diagram exemplifies an embodiment of the method of the present invention.

Referring now to FIG. 1, there is shown a reservoir of a liquid requiring chemical treatment, i.e., swimming pool S, which contains a relatively large body of water. The water in pool S is continuously withdrawn from the pool through line 60 and recirculated to the pool by line 67 after treatment. The main function of a typical pool recirculation system is to continuously filter the water to remove dust, dirt and suspended particles; add sanitizing agent to the pool water; and optionally heat or maintain the water at a desired temperature.

More specifically and as shown in FIG. 1, water is withdrawn from pool S and forwarded to the inlet or suction side of motor driven pump P through line 60. A portion of the output of the pump is forwarded by line 62 to filter F, which screens out various entrained solid impurities not removed by the strainer within skimmer means (not shown) in or appended to the pool, or in a strainer in line 60 prior to the inlet of pump P. Water from filter F, as shown, is forwarded to heater H where it is heated to a desired temperature for maintaining the pool water at a comfortable temperature. Use of heater H is optional and not all pool water recirculation systems include a heater. As shown, water from heater H (or filter F, if a heater is not used) is forwarded to the pool by return lines 65 and 67.

A portion of the water exiting the outlet of pump P is drawn into bypass line 64. The amount of water entering line 64 is controlled by valve 61. In accordance with one embodiment of the present invention, water entering bypass line 64 is introduced into mixer-injector I where it is mixed with inert gas and then forwarded by line 66 to chemical feeder C, where a solution of chemical material, e.g., sanitizing agent such as calcium hypochlorite, is controllably produced in desired concentrations. Water removed from feeder C is forwarded by line 68 to line 65 where it mixes with water exiting heater H (if used) or filter F (if a heater is not used). The water mixture is recirculated to pool S by line 67. While bypass line 64 is shown attached to recirculating line 62 on the discharge side of pump P, but before filter F, it is possible to attach the bypass line to line 63 on the discharge side of filter F or to line 65 on the discharge side of heater H. In such an embodiment, it is necessary to introduce mechanical means in a fluid transfer line to cause a pressure differential between lines 64 and 68, such as a valve or orifice plate, to provide the energy required to move water through mixer-injector I and chemical feeder C.

Also shown in FIG. 1, is gas disengaging or separating means 69 in line 68 to remove inert gas entrained or dissolved in the solution removed from feeder C. Disengaging means 69 may also be placed in line 67. Any conventional gas separating means known to those skilled in the art for separating gas from a liquid can be used to separate inert gas from the liquid solution withdrawn from feeder C. Further, it is contemplated that liquid discharged from feeder C (or inert gas-free liquid removed from gas separating means 69) may be recirculated partially or totally to the inlet side of pump P, as shown by dotted line 68A.

Figure 2:
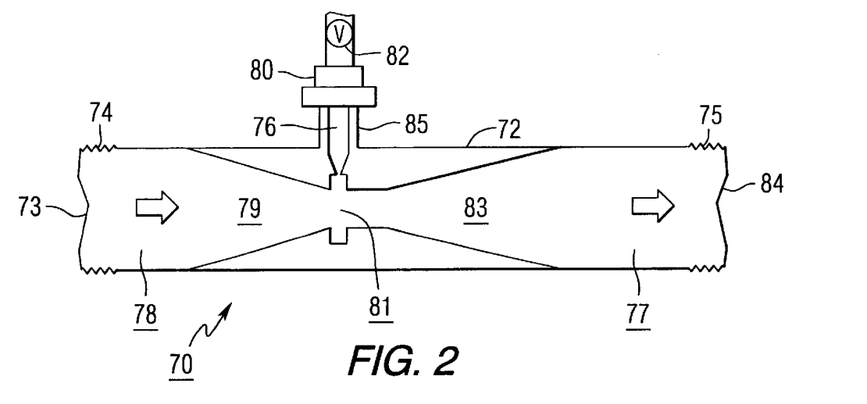
FIG. 2 is a perspective elevation view of a mixer-injector device that may be used to introduce inert gas into a chemical feeder (when plumbed into the inlet fluid line of the feeder)

Referring now to FIG. 2, there is shown a schematic of a perspective elevation view of aspirating mixer-injector device 70 that may be used in the method of the present invention. Device 70 may be of any suitable design provided that it creates a pressure differential between the inlet and outlet ends of the device, thereby to create a zone of negative pressure (vacuum) inside the injector body, which initiates aspiration or suction through a suction port of an inert gas into the fluid moving through the mixer-injector. Typically, device 70 is a Venturi-type differential pressure mixer-injector.

Device 70 includes an essentially cylindrical body 72 having connector threads 74 and 75 at either end for connection, for example to lines 64 and 66, when plumbed into a conduit through which fluid is flowing, e.g., a water recirculation system. The inside of cylindrical body 72 forms a flow passage extending along the central axis of body 72 from the inlet end 73, which is connected to a pressurized source of fluid (not shown) such as water, to the outlet end 84, which is connected to a user system (not shown). The flow passage is substantially cylindrical, but may have a slight taper if desired.

Device 70 has a fluid entry section 78 and a constricting section 79, that extends axially from the entry section 78 and is preferably frusto-conical in shape with a diameter that decreases as it extends away from the entry section. Constricting section 79 extends to an injection section 81 located at the smaller end of the constriction section. Expanding section 83 extends axially from the injection section 81 and is also preferably frusto-conical in shape with a diameter that increases as it extends away from the injection section. Expanding section 83 extends axially to exit section 77 and thence to outlet end 84. Between the constricting portion 79 and the expanding section 83 is the injection or aspirating section 81.

Suction/injector channel 76 within conduit 85 is situated immediately adjacent to the injection section 81. Suction/injector channel 76 is typically normal to the axis of cylindrical body 72. Conduit 85 is capped with check valve 80 to prevent fluid from flowing out of device 70 in the event that the aspirating function of the device fails. Mounted above check valve 80 may be a metering valve 82 that can be used to meter the amount of inert gas aspirated into device 70. Use of metering valve 82 is optional and can be eliminated or replaced with other metering arrangements. If metering means are not used, the size of the injector port can be selected (in connection with the flow rate of fluid entering device 70) to provide the required amount of aspirated gas.

Alternative gas metering arrangements that can be used include use of a solenoid valve connected to a float switch resting on the solvating fluid within the feeder or in a sight glass outside of the feeder, but in liquid communication with the fluid inside of the feeder. When the float switch is at a certain predetermined level, the solenoid valve is closed, thereby preventing gas from entering the feeder. Similarly, if the solvating fluid rises, the float switch opens the solenoid valve, thereby allowing gas to be introduced into the feeder. Another metering embodiment contemplated is the use of a float valve in a sight glass outside of the feeder or a tube within the feeder, which sight glass or tube is also in gas communication with the source of inert gas and provides the entry point of the gas into the feeder. When the fluid level is low (sufficient gas is contained within the feeder), the float valve drops and cuts off the flow of inert gas into the feeder; but, if the fluid level rises, the float valve also rises, thereby allowing gas to enter the feeder.

The type of aspirating mixer-injector described in FIG. 2 is described in more detail in U.S. Pat. Nos. 4,123,800 and 5,863,128, which are incorporated herein by reference for their description of aspirating mixer-injector devices. These patents describe Mazzei® injectors manufactured by the Mazzei Injector Corporation. Such injectors are available in a variety of sizes, e.g., from 0.5 inch (1.3 cm) male thread size to a 4 inch (10.2 cm) male thread size as well as 6, 8 and 12 inch (15.2, 20.3 and 30.5 cm) flange sizes. These injectors can handle from 0.75 to about 4900 gallons (2.8 liters to 18.5 kliters) per minute of fluid flow.

While the aspirating mixer-injector of FIG. 2 has been described with some detail, it is contemplated that any other mixer-injector or eduction device that is capable of mixing gases with a liquid such as water can be used, e.g., turbo-absorbers, and other nozzle devices that use a differential pressure injector, e.g., eductors made by Penberthy, Inc. Further, other means of introducing inert gas into the chemical feeder are contemplated. For example, the inert gas can be introduced into the feeder through its own separate line or conduit, e.g., a gas port in the feeder connected to a line connected to a gas cylinder, electrical air pump, fluid driven air pump or other gas pressure generating devices. These other sources of gas can of course also be connected to the injector port of the mixer-injector device of FIG. 2.

Further, it is contemplated that inert gas, e.g., air, can be introduced into the chemical feeder by means other than an injector device. For example, a simple bubbler or sparger can be plumbed into the fluid line leading to the feeder and inert gas introduced into the fluid line directly from an outside source of gas, e.g., cylinders of gas. Metering valves connected to the source of gas or the line leading to the main flow line will control the amount of gas introduced into the feeder. Additionally, it is contemplated that inert gas may be introduced directly into the chemical feeder by a conduit plumbed directly into the feeder in much the same manner as inert gas would be introduced directly into the fluid line leading to the feeder. A sight glass attached to the feeder can be used to indicate the level of fluid in the chemical feeder and thereby control the amount of gas required to be charged (continuously or batch wise) to the feeder.

While air is preferred as the inert gas to be used in the method of the present invention for both economic and environmental reasons, it is contemplated that other gases which are substantially chemically inert to the chemical material being used in the feeder (and the materials of construction used to fabricate the feeder, the mixer-injector (or other gas injection means), and other equipment and lines with which it comes into contact) and which are environmentally acceptable may also be used. As used herein, the term "inert gas" or "substantially inert gas" is intended to mean and include gases that are substantially chemically inert to the chemical material within the feeder (and not just inert in the classical definition of an inert gas) under the conditions at which the feeder is operated. Examples of such gases include, but are not limited to: nitrogen, air, oxygen, carbon dioxide, substantially carbon dioxide-free air, argon and helium. Other classical inert gases, such as neon, are contemplated, but are deemed too expensive to be practical and hence uneconomical. When calcium hypochlorite or isocyanurates are used as the chemical material and water is used as the solvating fluid, it is preferred that carbon dioxide not be used as the gas. Carbon dioxide can destabilize calcium hypochlorite and lower the pH of the water, thereby requiring the addition of a basic neutralizing agent to the recirculating water.

Similarly, while water is typically the fluid used to dissolve chemical materials in chemical feeders, and is used to prepare aqueous sanitizing or disinfecting solutions to sanitize water and recirculating water systems, it is contemplated that solvents other than water that are used to dissolve chemical materials soluble in those solvents can be used for applications where such solvents can be tolerated. Such applications which find use for a pressurized chemical feeder can take advantage of the method of the present invention.

In the operation of the method of the present invention in the recirculation system depicted in FIG. 1 using the injector of FIG. 2, water is withdrawn from pool S and forwarded to the injection side of pump P. Valve 61 is opened to allow water from the outlet of pump P to flow through injector I. As water flows through injector I, an area of negative pressure is created in injection section 81. Metering valve 82 is open to allow air to be aspirated into the injection section 81 where it mixes with water flowing through the injector. The air/water mixture is forwarded to chemical feeder C, which operates under a positive pressure and, in the absence of the injected air, in a flooded condition. Air introduced into feeder C rises to the top of the inside of the feeder creating an air space that forms a barrier to water filling completely the feeder. Sufficient air is allowed to enter feeder C by means of metering valve 82 or the size of suction/injector channel 76 and/or the volume of water passing through injector I per unit of time to regulate the level of water in the feeder to a preselected or predetermined level and thereby control the amount of chemical material contacted by water entering the feeder.

Air is likely to be removed from the feeder (by dissolution in the water or simply by being entrained with the water discharged from the feeder). Inert gas (air) separating means 69, i.e., a gas/liquid separator, may optionally be included in line 68 (or 67) to separate the inert gas from the solution discharged from the feeder (or from fluid being recirculated to the pool through line 67). Any gas not removed by the inert gas (air) separator will be forwarded with the water being recirculated to the pool where it dissipates into the atmosphere. In the event the inert gas is not air or an environmentally friendly gas that can be safely vented into the atmosphere, additional precautions will be required to insure that gas removed from the feeder with the solution of chemical material is completely separated from the recirculating fluid (and properly recycled or disposed of so that the system is a zero discharge system).

Figure 5:
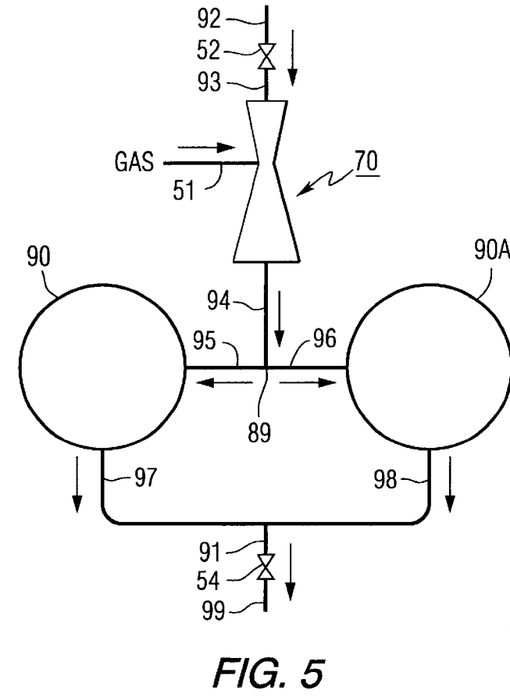
FIG. 5 is a schematic top plan view of an arrangement of a mixer-injector device, such as the device of FIG. 2, connected to two chemical feeders, such as the chemical feeder of FIG. 4, which feeders are connected in parallel.
Figure 6:
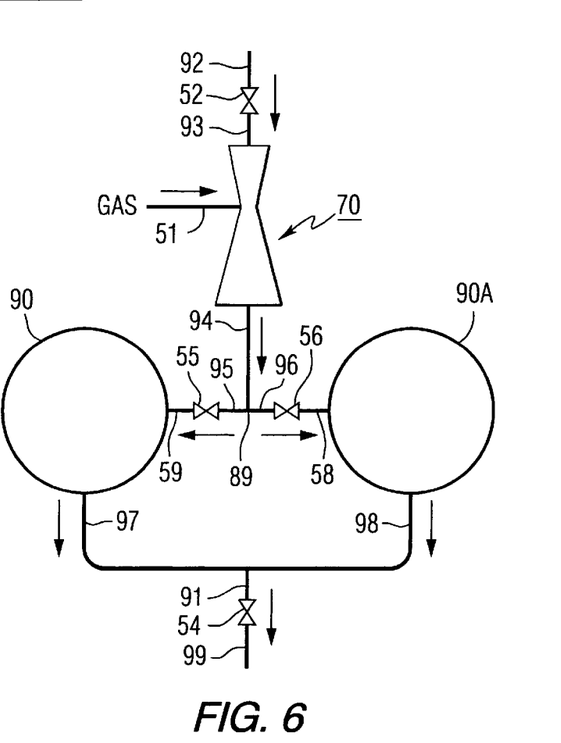
FIG. 6 is a schematic top plan view of the arrangement shown in FIG. 5, but with additional valves in each of the inlet lines leading to the chemical feeders.
Figure 7:
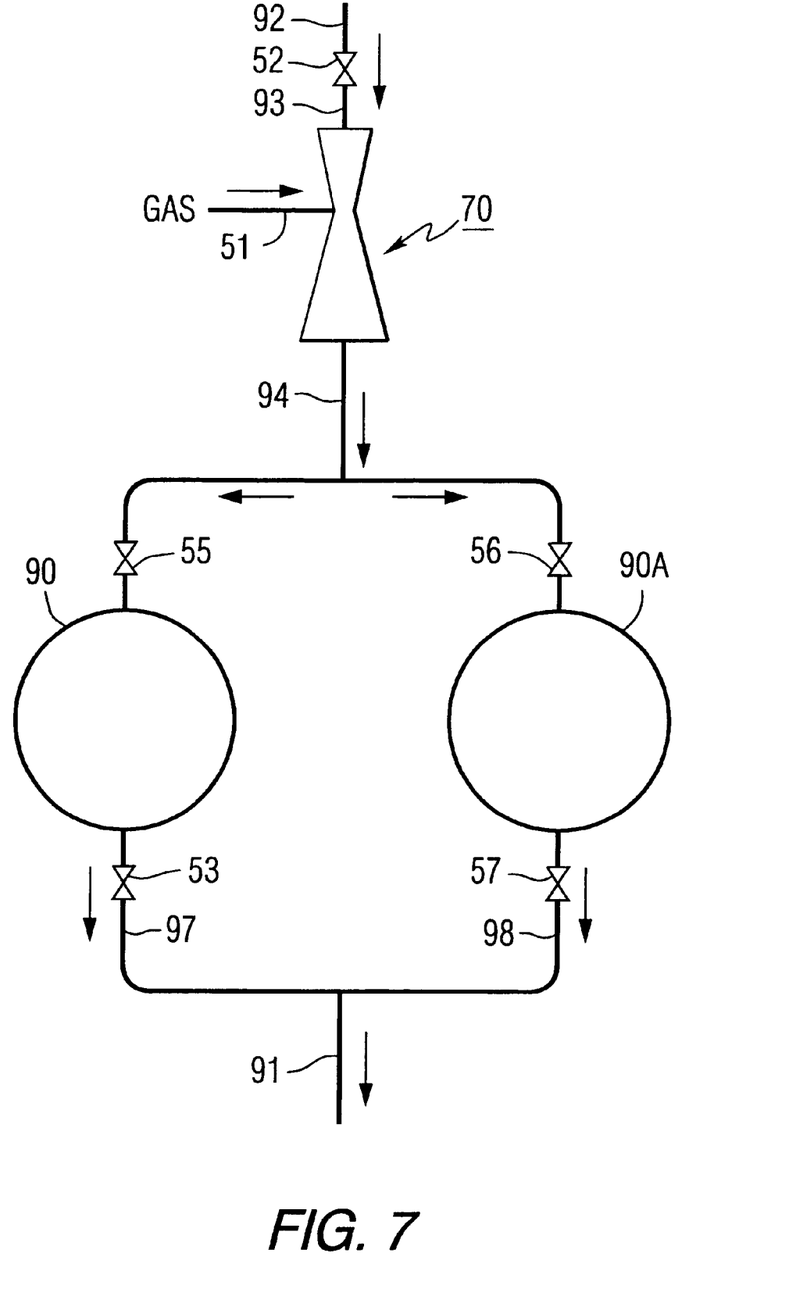
FIG. 7 is a schematic top plan view of an arrangement of a mixer-injector device, such as the device of FIG. 2, connected to two chemical feeders in a manner similar to but different from the connection shown in FIG. 6 and with valves in the discharge lines of the feeders.

Referring now to FIGS. 5, 6 and 7, wherein like reference characters refer to like parts, there are shown schematic plan views of an arrangement of chemical feeders and an injector device. More particularly, there is shown a mixer-injector 70, as in FIG. 2, in which fluid, e.g., water, is supplied from a source, not shown, by means of line 92 and introduced into injector 70 by line 93. The rate at which fluid is supplied to injector 70 is controlled by valve means 52. Gas, e.g., air, is aspirated into injector 70 through a suction port (not shown), but depicted by line 51. A mixture of air and fluid is discharged from injector 70 and forwarded by line 94 to a conventional T section of pipe 89 that connects lines 95 and 96, which feed respectively chemical feeders 90 and 90A. Feeders 90 and 90A may be mounted on individual bases by any suitable means, as described with respect to the feeder of FIG. 3, e.g., by use of an adhesive or other suitable attachment means. When dual feeders are used, as shown in FIGS. 5, 6 and 7, both feeders can be mounted on a single base unit.

In FIG. 6, valve means 55 and 56 are placed respectively in lines 95 and 96. This arrangement allows fluid to be introduced into feeders 90 and 90A at different flow rates. Fluid traversing valves 55 and 56 is forwarded by lines 59 and 58 respectively to chemical feeders 90 and 90A. Fluid containing chemical material is removed from feeders 90 and 90A and forwarded respectively by lines 97 and 98 to a standard T section of pipe (not shown) and from thence to line 91. The flow of fluid through line 91 is controlled by valve means 54. Fluid passing valve means 54 is carried by line 99, which leads directly or indirectly to the point of use of the solution of chemical material.

In FIG. 7, valves 53 and 57 are placed in lines 97 and 98 respectively to control the flow of fluid leaving feeders 90 and 90A respectively. Fluid removed from feeders 90 and 90A are forwarded to a standard T section of pipe (not shown) and from there (directly or indirectly) to the point of use by line 91 In this embodiment, valve 54, as shown in FIG. 6, is eliminated.

While one mixer-injector device 70 is shown in FIGS. 5, 6 and 7 operating in combination with dual feeders 90 and 90A, it would be clear to those skilled in the art that a plurality of mixer-injector devices can be used to practice the method of the present invention. For example, each feeder can be connected to a separate mixer-injector, or a plurality of mixer-injectors can be used in series or in parallel to provide the inert gas introduced into the feeder(s).

Chemical feeders 90 and 90A can be of any suitable design required for the particular end use application. They can be identical, similar or of different designs. While FIGS. 5, 6 and 7 illustrate the use of two chemical feeders in parallel, it is contemplated that only one feeder can be used, as shown in FIG. 1. In another contemplated embodiment, more than one feeder, e.g., two, three or more, feeders can be used in series. Further, it is also contemplated that more than two feeders, e.g., three, four or more feeders, can be used in a parallel arrangement in a fluid treatment system. Again, these multiple feeder arrangements can be used in a manner in which one or more feeders are operated simultaneously, (in parallel or in series) while other feeders are placed in a stand-by status; or all of the feeders in a multiple feeder arrangement can be used simultaneously. Obviously, the use options available with a multiple feeder arrangement are varied and one skilled in the art can select any suitable option required for the particular application.

Chemical feeders that may be used in the method of the present invention can vary and include any feeder presently known in the art or subsequently developed that can operate (or be modified to operate) in a pressure mode, i.e., under pressures above atmospheric. Examples of such feeders include those described in U.S. Pat. Nos. 3,595,395; 4,584, 106; 4,732,689; 4,842,729; 5,089,127; 5,384,102; 5,427, 748; 5,441,711; 5,932,093; and U.S. patent application Ser. No. 09/738,179, filed Dec. 15, 2000, which is titled Chemical Feeder. The disclosures of the aforelisted patents and application are incorporated herein in toto insofar as such disclosures relate to chemical feeders.

In the pressure mode of feeder operation, solvating fluid introduced into the feeder tends to fill the feeder and/or contact all of the chemical material provided within the feeder. Such feeders are commonly referred to as soaker feeders because the solvating fluid, e.g., water, soaks the chemical material therein. In the method of the present invention, inert gas, e.g., air, is introduced into the feeder in order to displace a selected portion of the solvating fluid that comes into contact with the chemical material within the feeder, thereby to limit the amount of chemical material in contact with the solvating fluid and thereby better control the concentration of chemical material in the solution forwarded to the end use application.

Figure 3:
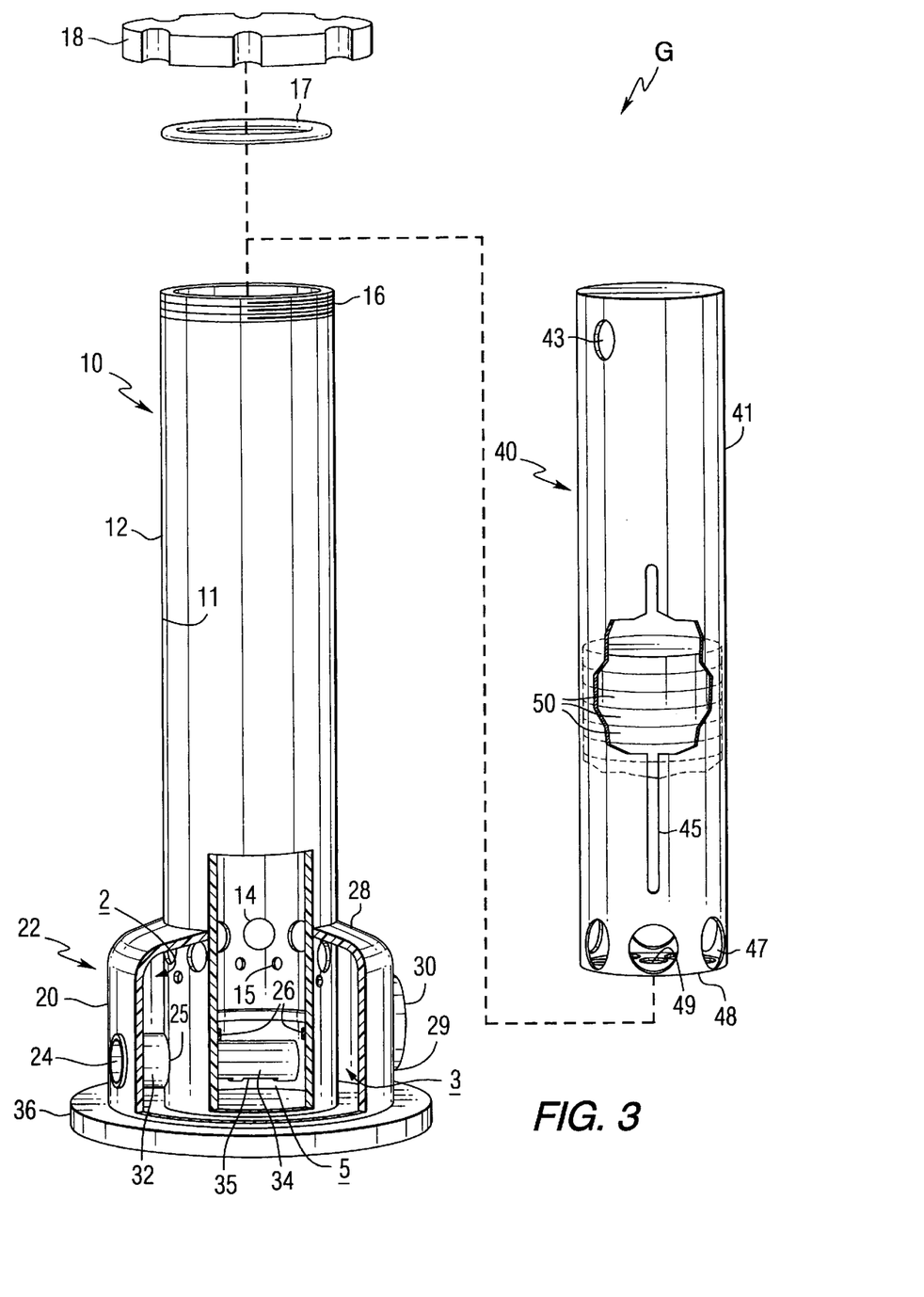
FIG. 3 is a partially exploded, partially cut away perspective view of a chemical feeder, including a canister which is inserted within the feeder, that may be used in combination with the mixer-injector device of FIG. 2 to practice the method of the present invention.

A particular chemical feeder that may be used with the method of the present invention is shown in FIG. 3. This feeder is described in the aforementioned U.S. patent application Ser. No. 09/738,179. Referring now to FIG. 3, there is shown feeder G, which includes a housing 22 having a base 36, side wall 20 extending upwardly from said base, and a closed upper end 28, all of which together define a cavity 2. Base 36, as shown, is circular in shape and larger than the area enclosed by the side walls of the housing, i.e., the perimeter of the base is larger than the perimeter of the side wall 20 of the housing. Alternatively, base 36 may have the same dimension as the perimeter of the housing side wall. Moreover, the base may have a shape other than circular, e.g., elliptical, square, rectangular, etc. Preferably, the base is circular and larger than the perimeter of the side wall of the housing to provide stability to the feeder when placed in an upright and standing position.

Housing 22, as shown, is in the form of an inverted cup, wherein the lower portion of the side wall 20 is in the shape of a short cylinder and the upper section of the side walls are bent, i.e., arched, toward and attached to the side wall 12 of container 10, e.g., by cementing, thermal welding, etc., thereby to form the closed upper end 28 of the housing. Alternatively, the closed upper end 28 of the housing may be fabricated with a flat circular plate flange having a center hole, the diameter of which is the same as the outside diameter of container 10, which plate is affixed in any conventional way to the top of vertical side wall 20 of housing 22 and to the outside of side wall 12 of container 10. Additionally, the closed upper end 28 of housing 22 may be in the shape of a truncated cone extending from the top of side wall 20 to the outside of side wall 12 of container 10. The shape and size of housing 22 (and the other components of the feeder) is not critical. It can be of any suitable size and shape to accommodate the specific implementation required for feeder G, e.g., the size of container 10 and the desired liquid flow rate capacity. For ease of fabrication, it is preferred that housing 22 be substantially cylindrical.

Housing 22, as shown, has a circular opening in the center of its upper end 28 that is the same diameter as the outside diameter of elongated, substantially vertical hollow container 10. For ease of fabrication, container 10 is formed from a hollow cylinder, i.e., in the form of a pipe that is open at both ends; however, container 10 may be of any suitable shape in which event the opening in the upper end of housing 22 will match the geometry of the container.

The bottom of side wall 12 of container 10 is adjacent to base 36 and may be attached to base 36 by any suitable means so as to provide a water (or dissolving liquid) tight seal and to form the perimeter of chamber 5, e.g., thermal welding, by use of an adhesive, embedding and cementing the side wall into a circular groove cut into the base member, etc. It is contemplated that cylinder 10 may be formed from a cylinder that is closed at the lower end so that the closed end rests on and is attached to base 36 by conventional attachment means. In that case, the lower end of side wall 12 as contemplated herein would also be considered as being adjacent to base 36. Side wall 12 of container 10 is spaced from side wall 20 of housing 22, thereby to define a collection zone 3, which is a part of cavity 2 and which surrounds the outside of the lower portion of container 10. The volume of collection zone 3 is defined by the inside of side wall 20 of housing 22, the outside of side wall 12 of container 10, and the inside surfaces of base 36 and the upper end 28 of housing 22 located between the afore-described side walls. The specific volume of collection zone 3 can be varied and will depend on the specific implementation of the feeder; namely, the size of the feeder required to accommodate the maximum volume of liquid to be handled by the feeder for its intended application. It is contemplated that the flow of liquid through feeder G over a 24 hour period may range from 30 gallons (113.6 liters) to 14,400 gallons (54.5 kliters), e.g., an average of 3000 gallons (11,356 liters), i.e., 0.2 to 10 gallons/minute (0.75 to 37.85 liters/minute). The flow rate of liquid through the feeder can vary from the specific values described. For example, higher flow rates can be attained by increasing the size of inlet conduit 32, outlet conduit 30 and distribution pipe 34 and injector 70.

Side wall 12 of container 10 extends above the closed upper end 28 of housing 22 to a point remote from upper end 28, and contains a plurality of perforations 14 arrayed in the lower portion thereof, which lower portion is below the inside wall of upper end 28 of housing 22. As shown in FIG. 3, perforations 14 in side wall 12 are circular in shape and are arrayed with all of their centers in the same horizontal plane. In another contemplated embodiment, perforations 14 may be staggered in different planes, thereby to provide a group of perforations in several horizontal planes. While shown as circular, perforations 14 may be of any shape, but preferably are circular. The size of perforations 14 may vary, but should be selected so as to accommodate (in combination with perforations 15, if used) the peak volume of liquid flowing through the feeder, but not so large as to compromise the structural integrity of container 10. Perforations 14 (and 15, if used) allow liquid communication between the inside of container 10 and collection zone 3.

In a further contemplated embodiment, side wall 12 contains an additional group of perforations 15 which are arrayed below perforations 14. As noted with respect to perforations 14, perforations 15 may be of a shape other than circular. In the embodiment depicted in FIG. 3, perforations 15 are circular in shape and smaller in size than perforations 14, although they do not have to be smaller in size. The total area of the openings provided by perforations 15 is smaller than the total area of the openings provided by perforations 14. Hence, the size and number of the perforations 14 and 15 are determined to satisfy this requirement. While the ratio of the area of the openings of perforations 14 to that of perforations 15 may vary, such ratio is greater than 1:1. In contemplated embodiments, the ratio is greater than 2:1, e.g., from 4:1 to 16:1, particularly 8:1. The ratio can vary from any lower specified ratio to any higher specified ratio. The total area of the perforations 14 and 15 controls the dissolving liquid flow characteristics, i.e., the depth of liquid within container 10 and the permissible liquid flow rate.

Perforations 14 also may be arrayed in several horizontal planes or in one horizontal plane. In this embodiment, the plurality of perforations in the lower portion of the side wall of container 10 comprise a group of perforations in an upper section (in the lower portion of the side wall) and a group of perforations in a lower section (in the lower portion of the side wall), the perforations in the lower section being below the perforations in the upper section. As described, the perforations in the lower section provide a smaller total area than the total area of the perforations in the upper section. As depicted in FIG. 3, each individual perforation in the lower section is of the same size and shape as one another and is smaller than the individual perforations in the upper section, which are also of the same size and shape as one another.

Use of an upper section of perforations and a lower section of perforations allows the feeder to be operated with a greater turn down in the delivery rate of chemical material as the flow rate of dissolving liquid is reduced, i.e., a wider range of delivery rates as a result of changing liquid flow rate is obtained compared to feeders that do not have this feature. The feeder can be operated with a flow of liquid such that liquid entering the container and contacting exposed chemical material within the lower portion of the canister exits the container only through perforations in the lower section, which results in an aqueous product stream withdrawn from collection zone 3 that has a relatively low concentration of chemical material compared to a product stream produced at a higher liquid flow rate wherein the liquid exits the container through perforations in both the upper section and the lower section.

The rim at the top of cylinder 10 is threaded with external threads 16. Lid or cap 18 having internal threads (not shown) that match external threads 16 is threaded onto the top of cylinder 10 to close the upper end of hollow container 10. O-ring 17 of a diameter the same as that of container 10 at its upper end is located in an annular groove (not shown) within lid 18 so that when lid 18 is screwed onto container 10 and is in place, the lid compresses O-ring 17, thereby separating the inside of cylinder 10 from the outside environment. O-ring 17 may be fabricated from EPDM (ethylene propylene diene monomer), VITON® fluoroelastomer or other elastomers resistant to the chemical material retained in the canister. As shown, lid 18 is notched around its perimeter to allow for a tight grasp of the lid by the operator and to provide a means to promote easy turning of the lid; however, the side of lid 18 can be smooth or of any other conventional shape.

Lid 18 may also have a series of internal notches (not shown) around its inside perimeter adjacent to the internal threads to allow pressure within the feeder G to be released prior to the lid being completely removed from container 10. In practice, the lid is removed slowly to allow the release of pressure within the feeder and prevent the lid from being propelled off of the container should any substantial level of pressure remain in the feeder when the lid is removed to replace or refill the canister. The internal pressure relief notches may also be placed around the outside of container 10 (rather than the lid) in the thread portion 16, and the O-ring attached to container 10 just below threads 16.

While lid 18 is shown as being attached to cylinder 10 by threaded attachment means, any suitable art-recognized removable attachment means, e.g., clamps, bolts, screws, latches, etc., may be used to maintain a sealed environment within the upper portion of container 10. Preferably, attachment means that facilitate the separation of the lid from the container, e.g., clamps or a threaded attachment, and which serve to insulate the inside of the container from the outside environment are used. Lid 18 may be permanently attached to the canister, i.e., not removably attached; and, in such an embodiment, the canister is filled with chemical material before attaching the lid.

Referring further to FIG. 3, there is shown cylindrical hollow canister 40 for retaining solid chemical material therein. As illustrated, canister 40 has a base 48, side walls 41 and a plurality of perforations 47 and 49 in its lower portion. As shown, perforations 47 are arrayed around the lower end of side wall 41 and perforations 49 are arrayed in base 48 of the canister. Perforations 47 and 49 are of a shape and size so as to expose only the lowermost portion of the chemical material placed in the container. The number, size, shape and location of the perforations in the canister may vary, depending in part on the size of the canister, the liquid delivery rate and the chemical material concentration desired in the liquid withdrawn from feeder F. The size, shape and location of the perforations should not adversely affect the structural integrity of the canister. While the perforations are depicted as circular, they may be of any suitable geometric shape.

In the embodiment illustrated in FIG. 3, canister 40 has a substantially constant diameter along its vertical length that is slightly smaller, e.g., 0.13 inches (0.33 cm.) smaller, than the inside diameter of container 10 so that canister 40 is slidably received within container 10 and spaced from the inside side wall 11 of container 10. When inserted into container 10, canister 40 is supported in place by a canister support ring 26 attached to the lower inside wall of container 10. Support ring 26 is preferably located below perforations 14 and 15 of container 10, but above distribution pipe 34. While a support ring is shown, canister 40 may be supported within container 10 by any suitable means, such as by a snap ring near the upper portion of the inside wall of container 10, or by other suitable removable attachment means, including attachment to the lid.

In the embodiment shown in FIG. 3, canister 40 is of a length such that perforations 47 and 49 in the lower portion of the canister are located below perforations 14 and 15 of container 10. However, the bottom of canister 40 can be below, near the same level or even slightly above perforations 14 in container 10. Canister 40, as shown, has a length substantially the same as the useable length of container 10, i.e., from just below the rim at the top of container 10 to support ring 26; and is cylindrical in shape with a vertical axis coaxial with the vertical axis of container 10.

Base 48 of canister 40 may rest on support ring 26, as shown in FIG. 1, or it may be positioned at a level equal to or slightly above, e.g., juxtaposed to, the most upper portion of the uppermost perforations 15, or any level between the two. Positioning the level of base 48 of canister 40 at the desired location may be accomplished by conventional techniques known to those skilled in the art, which will depend on whether the position desired is to be permanent or temporary, i.e., a variable position. If the former, the support ring or other means of support, e.g., snap ring, can be located to provide the desired position. If the latter, other means known to those skilled in the art for varying the level of base 48 within the lower portion of container 10 can be used. For example, container 10 can be threaded internally at a point along its length (but above perforations 14) and canister 40 can be threaded with matching threads at a point along its length so that when canister 40 is inserted into container 10, the matching threads mesh and canister 40 can be moved vertically the length of the threads, usually a short distance, by turning the canister to position the base 48 at the desired level within the container.

In another embodiment, a series of vertically placed notched rings, e.g., offset along different vertical lines, can be attached to the inside of container 10 and a matching lip attached to the outside of the canister so that the canister can be lowered or raised in a series of steps by turning the canister until the lip on the canister matches the notch in the ring. In a further contemplated embodiment, a cross member may be placed on support ring 26 to raise the level of base 48 and support canister 40. The cross member may be fabricated of any suitable material, such as the materials from which the feeder is fabricated, as described in this description.

The cross member, if used, may be of any suitable design, e.g., a ring or screen with large openings, provided that it does not substantially obstruct the flow of liquid into canister 40 through perforations 49. Further, such a support member may be attached permanently to base 48. At low liquid flow rates and with the base 48 raised to approximately the level equal to a position that is aligned horizontally with the most upper section of the uppermost of perforations 15 and with liquid flowing out largely through perforations 15, the chemical material, e.g., tablets, within canister 40 is barely wetted by the dissolving liquid, thereby producing a product effluent with a very dilute concentration of chemical material. As the base of canister 40 is lowered from the aforedescribed position, more chemical material will be wetted, thereby producing a more concentrated product effluent. By varying both the position of the base 48 of canister 40, the liquid flow rate, and the amount of inert gas introduced into the feeder, product effluent with a wide range of chemical material concentrations can be provided.

Canister 40, as shown, has a finger hole 43 near its upper portion to allow the canister to be removed from the container when the chemical material retained therein is depleted. While one finger hole is shown, two holes 180 degrees apart, or multiple finger holes can be used. Further, while finger holes for removing the canister are shown, other removal means can be used, e.g., by use of an external reverse vise that is inserted into the canister and tightened to extend and compress the sides of the vise against the inside wall of the canister, or a handle can be attached to the inside wall of the canister. The canister can then be removed by lifting on a handle attached to the vise.

Solid chemical material retained within the canister can be of any suitable shape and size provided that it is not of a size that it falls out of the perforations 47 and 49 in canister 40 when the canister is being filled. Preferably, the solid chemical material is in the form of tablets 50 or small cylinders that will bridge perforations 47 and 49; more preferably, tablets of a diameter nearly the same as the inside diameter of the canister, but of a diameter that permits easy loading of the tablets into the canister are used.

Solid chemical material charged to a feeder used in the method of the present invention, can be of any suitable size and shape, and will depend on the design of the feeder and the zone within the feeder where the solvating fluid contacts the chemical material. Hence, the chemical material can be in the form of a powder, in granular form, in the shape of pellets, cylinders, tablets, either round or of any suitable geometric shape; and can be of any suitable size or weight for the feeder being used. For feeders of the nature of FIGS. 3 and 4, the chemical material will be of a size sufficient to bridge the perforations in the canister 40.

In a preferred embodiment, container 10 is fabricated from a clear material so that during operation of the feeder, the operator can observe the outside of the canister, which is interposed within the container. In such an embodiment, it is useful for canister 40 to also have an elongated narrow vertical perforation, e.g., slot 45 in and through side wall 41 so that the feeder operator can observe the level of chemical material within the canister and determine when it is necessary to replenish the chemical material.

While FIG. 3 illustrates a single canister that is slidably received within container 10, it is also contemplated that container 10 may be of a larger size so as to accommodate more than one canister, e.g., two or more canisters. In such event, the canisters would not be of a diameter such that they would be slidably received within the container but would be of a size such that a multiple number (or bundle) of canisters, e.g., 2 to 4 canisters, would fit either individually or as a bundled unit within the container and be supported therein by means known to those skilled in the art, e.g., a support plate resting upon support means, projecting from the side wall of container 10, such as a support ring or annular ridge or series of stops attached to the interior wall of container 10, or other art-recognized supporting means having canister receiving holes, each adapted to receive and support one canister.

An inlet opening 24 is located in and near the lower portion of side wall 20 of housing 22. A similar inlet opening 25 is located in and near the lower portion of side wall 12, preferably on the same horizontal level as and in line with opening 24. An inlet conduit 32 extends through the side wall 20 of housing 22 and inlet 25 of container 10 and is connected to inlet distribution pipe 34 within chamber 5. In a preferred embodiment, inlet conduit 32 and distribution pipe 34 can be a single conduit.

Inlet conduit 32 and inlet distribution pipe 34 are used to introduce liquid into chamber 5. Pipe 34 has a series of small holes or one or more slots 35 on the bottom to allow liquid to flow from the pipe toward the bottom of base 36. The end of pipe 34 may be open or closed, but is preferably open. Inlet conduit 32 can be connected to a source of liquid, e.g., a pressurized aqueous stream, in which the chemical material is soluble. As in FIG. 1, inlet conduit 32 can be connected to a mixer-injector device, such as the device shown in FIG. 2.

In another embodiment, the end of pipe 34 is closed and is attached to the inside wall 11 of container 10 within chamber 5. An inlet control valve (not shown) is mounted on inlet conduit 32 at a location outside housing 22 to regulate the flow of liquid entering chamber 5 within the feeder.

An outlet opening 29 is located in side wall 20 of housing 22, preferably at a location 180° from the inlet it opening 24, although the location of both the inlet and outlet openings and their relation to each other is not critical. Outlet conduit 30 extends from outlet opening 29 for removal of the solution of chemical material from the collection zone 3. Outlet conduit 30 can be connected to a suitable conduit, e.g., piping means and hoses known to those skilled in the art (not shown) through and by which the liquid stream containing dissolved chemical material may be transported to a remote location, e.g., a storage vessel or to the point of application or use, e.g., to a reservoir, swimming pool, hot tub, cooling tower, etc., by various piping means known to those skilled in the art. Inlet conduit 32 and outlet conduit 30 may be provided with threaded portions or other conventional connecting means, e.g., quick-release fittings to provide connections to associated conduits, pipes, hoses and pumps, as described above, for movement of the liquid to and from feeder F.

A small drain hole (not shown) may be placed in side wall 12 of container 10 below support ring 26 to allow liquid in the chamber below canister 40 to be drained into collection zone 3 when the feeder is not in operation. The draining of chamber 5 prevents continuing dissolution of chemical material by the liquid remaining in and in contact with the bottom of the canister so that when the feeder is started, liquid effluent containing a high concentration of chemical material is not delivered. Also, draining prevents the soaking of chemical material in the canister.

Figure 4:
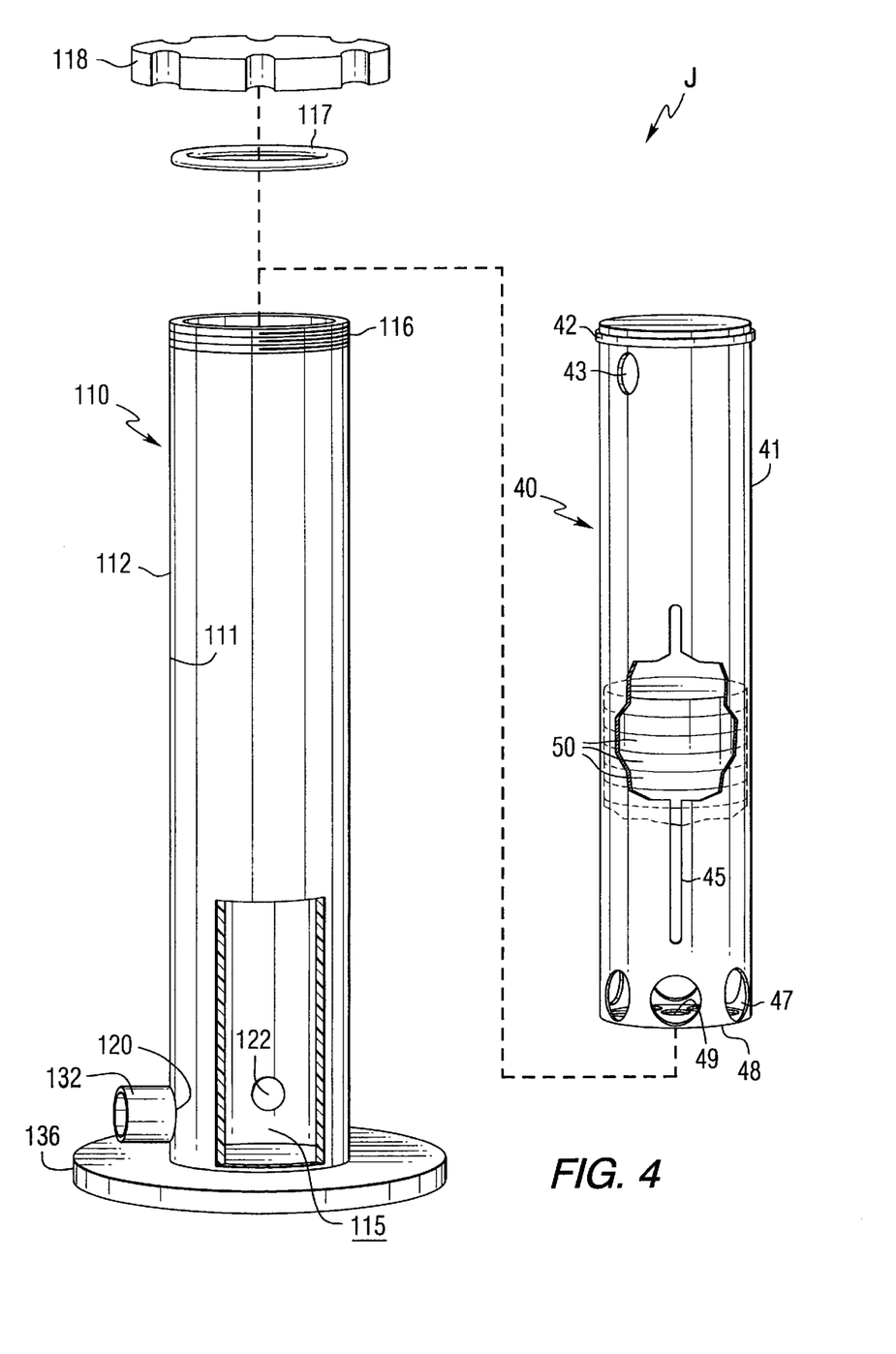
FIG. 4 is a partially exploded, partially cut away perspective view of a chemical feeder, including a canister which is inserted within the feeder, that may also be used in combination with the mixer-injector device of FIG. 2 to practice the method of the present invention.

Referring now to FIG. 4, there is shown chemical feeder J, which may also be used in the method of the present invention. Canister 40 can be used in both feeders G and J. The container for feeder J differs structurally from that of feeder G; however, the previous discussion herein with respect to feeder G of FIG. 3 is equally applicable to that of feeder J, except for the structural differences shown in FIG. 4.

In FIG. 4, there is shown feeder J, which includes container 110 having a side wall 112. The bottom of side wall 112 is adjacent to base 136 and may be attached to the base by any suitable means so as to provide a water (or solvating fluid) tight seal, e.g., by thermal welding, by use of an adhesive, embedding and cementing the side wall into a circular groove cut into the base member, etc. Container 110 is an elongated, substantially vertical hollow container. For ease of fabrication, container 110 is formed from a hollow cylinder, i.e., in the form of a pipe that is open at both ends. It is contemplated that container 110 may be formed from a cylinder that is closed at the lower end so that the closed end rests on and is attached to base 136 by conventional attachment means, e.g., as discussed above.

The lower portion of container 110 contains an inlet port 120, which may be threaded to accommodate a pipe nipple. Inlet conduit 132 can be attached or threaded into container 110 and serves to carry solvating fluid, e.g., water, into the lower section 115 of the interior of container 110. Similarly, an outlet port 122 is formed in the lower section of container 110. The outlet port is positioned at an angle from the inlet port, e.g., 90 degrees. It is contemplated that there may be more than one outlet port, and that the position of the outlet port(s) be other than as shown, i.e., 90 degrees from the inlet port.

A lid 118, O-ring 117 and threads 116 on the outside of the top of container 110 are provided in the same manner as discussed with respect to the feeder of FIG. 3. Similarly, a canister 40 is provided, which is substantially the same as the canister for feeder G shown in FIG. 3.

Figure 8:
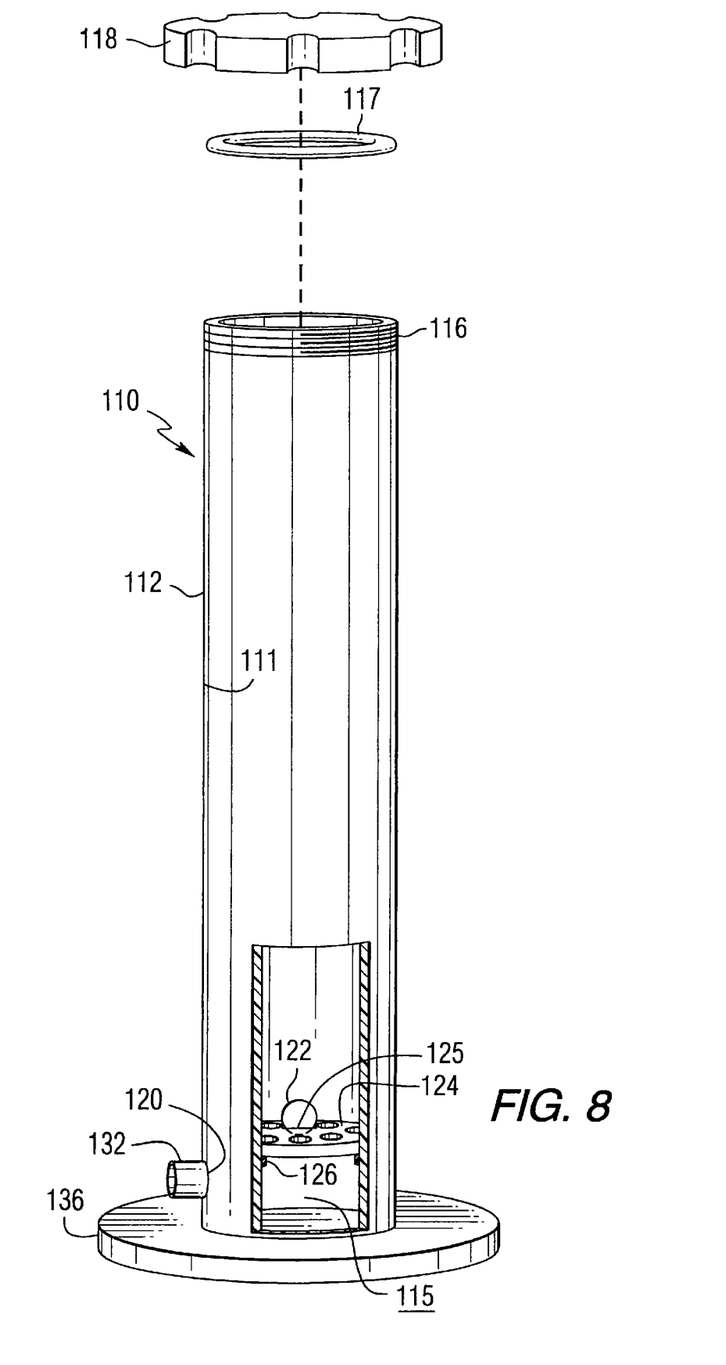
FIG. 8 is a partially cut away perspective view of a chemical feeder that may be used in combination with the mixer-injector device of FIG. 2 to practice the method of the present invention.

In a further contemplated embodiment, a feeder similar to the feeder of FIG. 4, but with no canister 40 may be used. In this embodiment, as shown in FIG. 8, a sieve plate 124 is mounted at about the level of outlet 122 around the inside wall 111 of container 110. The sieve plate may be mounted within container 110 at a height ranging from just below outlet 122 to just above outlet 122, or any height in-between. As shown in FIG. 8, sieve plate 124 is mounted on support ring 126. A notch 125 is placed in the sieve plate adjacent to outlet 122 to permit fluid to more easily flow out of outlet 122. Solid chemical material is charged to the container and rests on the sieve plate. The size and shape of the chemical material charged to the container will be such as to rest on and not readily fall through the holes in the sieve plate. Solvating fluid enters container 110 through port 120 and rises through the sieve plate to contact chemical material to a preselected level. The solution of chemical material thus formed is then withdrawn through outlet port 122.

As shown in FIG. 3, canister 40 rests on support ring 26. In FIG. 4, canister 40 has an annular shoulder 42 near the top of the canister, which allows the canister to hang from a snap ring or annular internal ridge or bead (not shown) placed near the top of the inside wall 111 of container 110. Other suitable removable attachment means can be used to support the canister within the container.

In FIG. 4, canister 40 is slidably received within container 110. The length of canister 40 is selected so that the bottom of the canister is approximately level with the center of the outlet port 122. However, it is contemplated that the bottom of the canister can be raised or lowered slightly from this position. In the method of the present invention, the level of the solvating fluid is controlled by the solvating fluid-gas interface, which is established by the amount of inert gas introduced into the container.

In an embodiment of the operation of chemical feeder J, as shown in FIG. 4, canister 40 is filled with tablets of solid chemical treating agent, e.g., calcium hypochlorite, and the canister is placed in container 110. Lid 118 is threaded onto container 110 and inlet conduit 132 connected to a source of liquid, e.g., water, containing an inert gas, e.g., air, mixed therewith. The air-liquid mixture is charged to inlet conduit 132, thereby introducing liquid and gas into the lower section 115 of container 110. The liquid introduced into chamber 115 rises within the container and contacts the exposed lowermost tablet(s) within canister 40. Inert gas, e.g., air, also rises within canister 40 and cylinder 110 and forms a gas head space within cylinder 110 (and in canister 40 above the tablets). Sufficient gas is allowed to enter the container to prevent liquid from rising within and around canister 40 to a level beyond that which is desired, i.e., the level of outlet 122. A liquid solution of calcium hypochlorite is formed by the liquid contacting the calcium hypochlorite tablets, and this solution is discharged from container 110 through outlet port 122, from whence it can be forwarded to a point of use, e.g., a swimming pool, through a suitable conduit, not shown.

Chemical feeders G, J and K and their various components may be fabricated from any suitable material or combination of materials that are chemically and corrosion resistant to the solid chemical treating agent used, examples of which include, but are not limited to, polyethylene, ABS (acrylonitrile-butadiene-styrene resin), fiberglass reinforced resins, polystyrene, polypropylene, poly(vinyl chloride) [PVC], chlorinated poly(vinyl chloride), copolymers of such materials or any other appropriate material(s) that is chemically resistant to the solid chemical being dispensed, e.g., a sanitizing agent such as calcium hypochlorite. Other materials such as stainless steel may also be used, but the use of such material would result in a substantial increase in cost. In a preferred embodiment, the feeder is fabricated from poly(vinyl chloride) (PVC), which is generally chemically resistant to water sanitizing chemicals, such as calcium hypochlorite. In a more preferred embodiment, the container is fabricated from clear PVC, e.g., type 1, grade 1, cell class 12454, and the canister is fabricated from polypropylene, e.g., Profax® 7823 resin, the remainder of the feeder being fabricated from PVC. Plastic parts of the feeder may be fabricated by art-recognized methods including, for example, injection, rotational, blow or extrude molding.

When constructed of plastic resin material, the various parts of the feeder may be joined together by solvent welding, thermal welding, cementing, e.g., by use of PVC cement or other suitable adhesive, or by threading. The inlet and outlet conduits may also be joined to the feeder by the use of conventional bulkhead fittings (tank adapters). If a metal, such as stainless steel is used, conventional welding of the parts may be used to fabricate the feeder. Alternatively, the various parts of the feeder may be joined by conventional threaded bolts and appropriate gasketing to insure that the feeder is sealed, e.g., water-tight.

The solid chemical material, or treating agent, used may be any chemical that is solid at ambient, i.e., standard, conditions of temperature and pressure (STP), and which is readily soluble in a flowing liquid, e.g., water, at STP conditions. Examples of such chemicals are sanitizing agents, e.g., chemicals that sanitize water, such as for example, calcium hypochlorite, bromo-chloro hydantoin, dichlorohydantoin and chlorinated isocyanurates; dechlorination agents such as sodium sulfite, sodium metabisulfite, sodium bisulfite, sodium thiosulfate, sodium hydrosulfide (NaSH), and sodium sulfide ($Na_2S$); and pH control agents such as sodium bisulfate, citric acid, sodium carbonate, and sodium bicarbonate.

It will be readily appreciated by those skilled in the art that the method of the present invention can be used in, for example: a single pass system, e.g., an aqueous stream used to sanitize the surface of an article, e.g., vegetables such as potatoes; or in a closed loop recirculating system, e.g., a recirculating system for the treatment of water used in, for example, a swimming pool, spas, hot tubs, boilers and cooling towers.

It will be apparent to those of ordinary skill in the art that various changes may be made to the method described herein without departing from the spirit and scope thereof. It should be understood that the described specific embodiments of the aforedescribed method demonstrate only certain contemplated and preferred embodiments, and that a variety of alternatives to those embodiments may be made to the invention without significantly affecting it.

The present invention has been described with reference to specific details of particular embodiments thereof. It is not intended that such details be regarded as limitations upon the scope of the invention except insofar as and to the extent that they are included in the accompanying claims.

We claim:

1. In the method of dissolving chemical material situated within a container wherein solvating liquid in which the chemical material is soluble is introduced into the container and brought into contact with the chemical material, thereby to produce a solution of the chemical material in the solvating liquid, and wherein a solution of the chemical material is withdrawn from the container, the improvement which comprises maintaining the container under positive pressure, and maintaining an atmosphere of substantially inert gas within the container while solvating liquid is introduced into the container and into contact with the chemical material, thereby to control the level of solvating liquid within the container.

2. The method of claim 1 wherein the chemical material is selected from the group consisting of calcium hypochlorite, bromo-chloro hydantoin, dichlorohydantoin, chlorinated isocyanurates, sodium sulfite, sodium metabisulfite, sodium bisulfite, sodium thiosulfate, sodium hydrosulfide, sodium sulfide, sodium bisulfate, citric acid, sodium carbonate, and sodium bicarbonate.

3. The method of claim 1 wherein the inert gas is selected from the group consisting of nitrogen, air, oxygen, carbon dioxide, argon, neon, helium and air which is substantially free of carbon-dioxide.

4. The method of claim 1 wherein inert gas is introduced into the container separate from the solvating liquid.

5. The method of claim 1 wherein inert gas is aspirated into a conduit connected to the container and then introduced into the container.

6. The method of claim 5 wherein solvating liquid and inert gas are introduced into the container through the same conduit.

7. The method of claim 5 wherein air is aspirated into the conduit using an aspirating, differential pressure mixer-injector.

8. The method of claim 7 wherein the mixer-injector is a Venturi-type differential pressure injector.

9. The method of claim 1 wherein the chemical material is calcium hypochlorite, the inert gas is air, and the solvating liquid is water.

10. The method of claim 9 wherein air is first mixed with water and the mixture of air and water introduced into the container.

11. In the method of dissolving chemical material situated within a container wherein solvating liquid in which the chemical material is soluble is introduced into the container and brought into contact with the chemical material, thereby to produce a solution of the chemical material in the solvating liquid, and a solution of the chemical material is withdrawn from the container, the improvement which comprises maintaining the container under positive pressure, and establishing and maintaining an atmosphere of substantially inert gas within the container while solvating liquid is introduced into the container and the solution of chemical material is being produced, thereby to control the level of solvating liquid within the container and control the amount of chemical material contacted by the solvating liquid.

12. The method of claim 11 wherein the chemical material is selected from the group consisting of calcium hypochlorite, bromo-chloro hydantoin, dichlorohydantoin, and chlorinated isocyanurates.

13. The method of claim 12 wherein the inert gas is nitrogen, air and substantially carbon dioxide-free air and the solvating liquid is water.

14. The method of claim 13 wherein the chemical material is solid calcium hypochlorite.

15. The method of claim 11 wherein the inert gas is selected from the group consisting of nitrogen, air, oxygen, substantially carbon dioxide-free air, and argon.

16. The method of claim 11 wherein the solvating liquid is water.

17. In the method of dissolving solid chemical material situated in a chemical feeder wherein solvating liquid in which the chemical material is soluble is introduced continuously into the feeder and brought into contact with the chemical material, thereby to produce a solution of the chemical material in the solvating liquid, and a solution of chemical material is withdrawn continuously from the feeder, the improvement which comprises maintaining the feeder under positive pressure while introducing solvating liquid therein, and establishing and maintaining an atmosphere of substantially inert gas within the feeder while solvating liquid is introduced into the feeder, thereby to control the level of solvating liquid within the feeder and control the amount of chemical material contacted by the solvating liquid.

18. The method of claim 17 wherein the chemical material is selected from the group consisting of calcium hypochlorite, bromo-chloro hydantoin, dichlorohydantoin and chlorinated isocyanurates.

19. The method of claim 18 wherein the inert gas is nitrogen, air or substantially carbon dioxide-free air, and the solvating liquid is water.

20. The method of claim 19 wherein the chemical material is solid calcium hypochlorite.

21. The method of claim 17 wherein the inert gas is selected from the group consisting of nitrogen, air, oxygen, substantially carbon dioxide-free air, and argon.

22. The method of claim 17 wherein the solvating liquid is water.

23. The method of claim 17 wherein the inert gas is introduced into the feeder through a conduit connected to the feeder.

24. The method of claim 23 wherein the inert gas and solvating liquid are introduced into the feeder through separate conduits.

25. The method of claim 23 wherein the inert gas and solvating liquid are introduced into the feeder through the same conduit.

26. The method of claim 23 wherein the inert gas and solvating liquid are introduced simultaneously into the feeder.

27. The method of claim 26 wherein inert gas in aspirated into the conduit connected to the feeder.

28. The method of claim 27 wherein aspiration of inert gas is produced by a differential pressure injector.

29. The method of claim 28 wherein the injector is a Venturi-type differential pressure mixer-injector.

30. The method of claim 26 wherein the inert gas and solvating fluid are introduced together and simultaneously into the feeder.

31. The method of claim 17 wherein sufficient inert gas is introduced into the feeder to form a gaseous head space within the feeder and control the level of solvating liquid within the feeder to a desired level, thereby controlling the desired amount of solid material to be contacted by the solvating liquid.

32. In the method of dissolving solid sanitizing agent situated in a chemical feeder wherein an aqueous solvent in which the sanitizing agent is soluble is introduced continuously into the feeder and brought into contact with the sanitizing agent, thereby to produce an aqueous solution of the sanitizing agent, and an aqueous solution of sanitizing agent is withdrawn continuously from the feeder, the improvement which comprises maintaining the feeder under positive pressure when aqueous solvent is introduced into the feeder, and maintaining an atmosphere of substantially inert gas selected from the group consisting of nitrogen, air, oxygen and substantially carbon dioxide-free air within the feeder while aqueous solvent is being introduced into the feeder, thereby to form a gaseous head space of inert gas within the feeder and control the level of aqueous solvent within the feeder to a preselected level.

33. The method of claim 32 wherein the sanitizing agent is selected from the group consisting of calcium hypochlorite, bromo-chloro hydantoin, dichlorohydantoin, and chlorinated isocyanurates.

34. The method of claim 32 wherein the sanitizing agent is calcium hypochlorite and the inert gas is selected from nitrogen and air.

35. The method of claim 32 wherein inert gas and aqueous solvent are introduced simultaneously into the feeder.

36. The method of claim 35 wherein inert gas and aqueous solvent are introduced into the feeder through the same conduit.

37. The method of claim 36 wherein inert gas is aspirated into the aqueous solvent using a differential pressure mixer-injector, and the resultant inert gas/aqueous solvent mixture is introduced into the feeder.

38. In the method of delivering an aqueous solution of sanitizing agent selected from the group consisting of calcium hypochlorite, bromo-chloro hydantoin, dichlorohydantoin, and chlorinated isocyanurates to a location where the aqueous solution is to be used wherein (a) aqueous solvent is introduced into chemical feeder apparatus means containing solid sanitizing agent and into contact with said sanitizing agent, thereby to produce an aqueous solution of said sanitizing agent, and (b) an aqueous solution of sanitizing agent is forwarded to said location, the improvement which comprises operating the feeder under positive pressure, and introducing substantially inert gas into the feeder simultaneously with the introduction of the aqueous solvent in amounts sufficient to form a gaseous head space within the feeder, limit the level of aqueous solvent within the feeder and limit the amount of sanitizing agent contacted by the aqueous solvent to a predetermined amount.

39. The method of claim 38 wherein the inert gas is air.

40. The method of claim 39 wherein the sanitizing agent is solid calcium hypochlorite.

41. The method of claim 39 wherein air is introduced into the feeder by passing aqueous solvent through a differential pressure injector, aspirating air into aqueous solvent passing through the injector, thereby to form a mixture of air and water, and introducing the air/water mixture into the feeder.

42. The method of claim 41 wherein the injector is a Venturi-type differential pressure injector.

43. The method of claim 38 wherein the location where the aqueous solution of sanitizing agent is to be used is a body of water.

44. The method of claim 43 wherein the body of water is a swimming pool.

45. In the method of treating a body of water with sanitizing agent, wherein water withdrawn from the body of water is introduced into chemical feeder apparatus containing solid sanitizing agent, thereby to form an aqueous solution of sanitizing agent, and wherein aqueous sanitizing agent solution is recycled to the body of water, the improvement comprising operating the feeder under positive pressure and introducing into and maintaining an atmosphere of substantially inert gas within the feeder while water is being introduced into the feeder, thereby to form a gaseous head space of inert gas within the feeder, limit the level of water within the feeder and limit the amount of sanitizing agent contacted by the water to a predetermined amount.

46. The method of claim 45 wherein the body of water is a swimming pool.

47. The method of claim 46 wherein the sanitizing agent is selected from the group consisting of calcium hypochlorite, bromo-chloro hydantoin, dichlorohydantoin, and chlorinated isocyanurates, and the inert gas is selected from the group consisting of nitrogen, air, oxygen, substantially carbon dioxide-free air, and argon.

48. The method of claim 47 wherein the sanitizing agent is calcium hypochlorite and the inert gas is air.

49. The method of claim 48 wherein water withdrawn from the pool is forwarded to the inlet of a pump; a portion of the output of the pump is introduced into mixer-injector means that aspirates air into the injector means, thereby to aspirate air into the water flowing through the mixer-injector means; output from the mixer-injector means is introduced into chemical feeder apparatus containing calcium hypochlorite; and aqueous solution of calcium hypochlorite is withdrawn from the chemical feeder apparatus and cycled to the pool.

50. The method of claim 49 wherein the calcium hypochlorite situated within the chemical feeder is a stack of calcium hypochlorite tablets.

51. The method of claim 49 wherein aqueous solution of calcium hypochlorite withdrawn from the chemical feeder is passed through gas disengaging means before being cycled to the pool.

* * * * *